(12) United States Patent
Sun et al.

(10) Patent No.: US 12,092,936 B2
(45) Date of Patent: Sep. 17, 2024

(54) POROUS PEROVSKITE NICKELATES WITH ENHANCED ELECTROCHROMIC PROPERTIES AND SYSTEMS THEREOF

(71) Applicant: Purdue Research Foundation, West Lafayette, IN (US)

(72) Inventors: Yifei Sun, Xiamen (CN); Shriram Ramanathan, West Lafayette, IN (US); Yoshitaka Sugita, Osaka (JP)

(73) Assignee: Purdue Research Foundation, West Lafayette, IN (US)

( * ) Notice: Subject to any disclaimer, the term of this patent is extended or adjusted under 35 U.S.C. 154(b) by 332 days.

(21) Appl. No.: 17/627,068

(22) PCT Filed: Jul. 17, 2020

(86) PCT No.: PCT/US2020/042629
§ 371 (c)(1),
(2) Date: Jan. 13, 2022

(87) PCT Pub. No.: WO2021/011904
PCT Pub. Date: Jan. 21, 2021

(65) Prior Publication Data
US 2022/0229339 A1 Jul. 21, 2022

Related U.S. Application Data

(60) Provisional application No. 62/875,051, filed on Jul. 17, 2019.

(51) Int. Cl.
*G02F 1/1524* (2019.01)
*C03C 17/245* (2006.01)
*C03C 17/34* (2006.01)

(52) U.S. Cl.
CPC ........ *G02F 1/1524* (2019.01); *C03C 17/2453* (2013.01); *C03C 17/3417* (2013.01); *C09K 2211/183* (2013.01); *C09K 2211/187* (2013.01)

(58) Field of Classification Search
CPC ............... G02F 1/1524; C03C 17/2453; C03C 17/3417; C09K 2211/183; C09K 2211/187
See application file for complete search history.

(56) References Cited

U.S. PATENT DOCUMENTS 4,938,571 A 7/1990 Cogan et al.
5,189,549 A 2/1993 Leventis et al.
(Continued)

OTHER PUBLICATIONS

ISR of PCT/US20/42629 (PCT Application of the present 371 application), Oct. 13, 2020.

*Primary Examiner* — George G. King
(74) *Attorney, Agent, or Firm* — Piroozi-IP, LLC

(57) ABSTRACT

An electrochromic structure is disclosed, which includes a first transparent non-conductive (GLASS-I) layer, a first transparent conductor (CONDUCTOR-I) layer coupled to the GLASS-I layer, an ion storage layer coupled to the CONDUCTOR-I layer, an electrolyte layer coupled to the ion storage layer, an electrochromic layer coupled to the electrolyte layer, a second transparent conductor (CONDUCTOR-II) layer coupled to the electrochromic layer, and a second transparent non-conductive (GLASS-II) layer coupled to the CONDUCTOR-II layer, wherein the electrochromic layer includes perovskite nickelates thin films formed on a transparent conductive film substrate and which has crystalline grains of the size of about 5 nm to about 200 nm resulting in intergranular porosity of about 5% to about 25%.

25 Claims, 8 Drawing Sheets

(56) References Cited

U.S. PATENT DOCUMENTS

| | | | |
|---|---|---|---|
| 2002/0196519 A1 | 12/2002 | Yasser et al. | |
| 2003/0227664 A1 | 12/2003 | Agrawal et al. | |
| 2005/0141074 A1 | 6/2005 | Chen | |
| 2006/0262377 A1 | 11/2006 | Kojima | |
| 2009/0262411 A1 | 10/2009 | Karmhag et al. | |
| 2014/0092462 A1 | 4/2014 | Le et al. | |
| 2014/0313562 A1 | 10/2014 | Ruoff et al. | |
| 2018/0059440 A1 | 3/2018 | Yu et al. | |
| 2020/0310211 A1* | 10/2020 | DeNolf | G02F 1/15165 |
| 2021/0255518 A1* | 8/2021 | Sun | G02F 1/1524 |

* cited by examiner

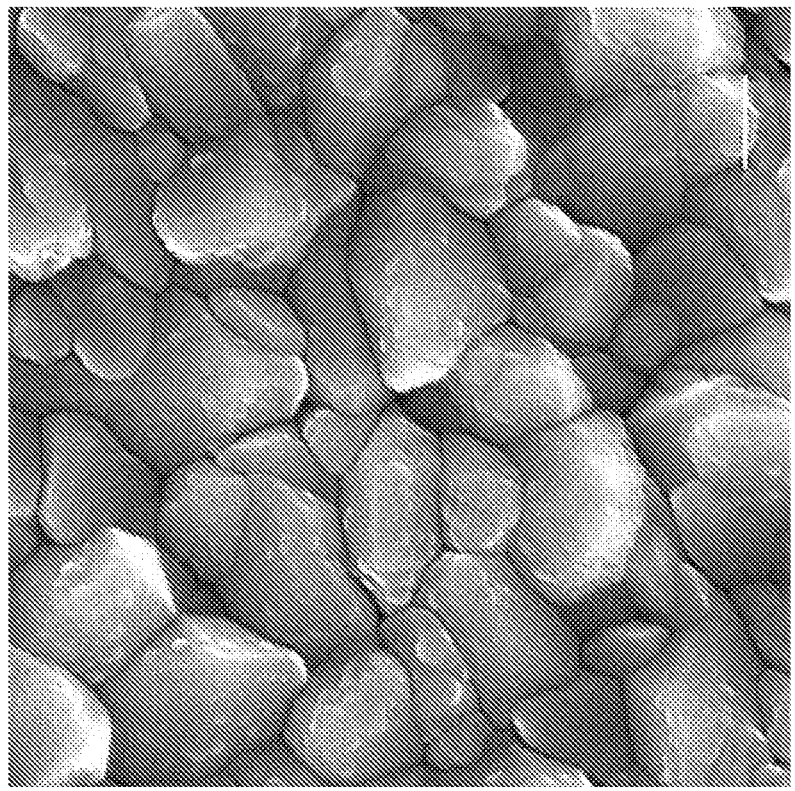
FIG. 3B: Dense NNO/FTO
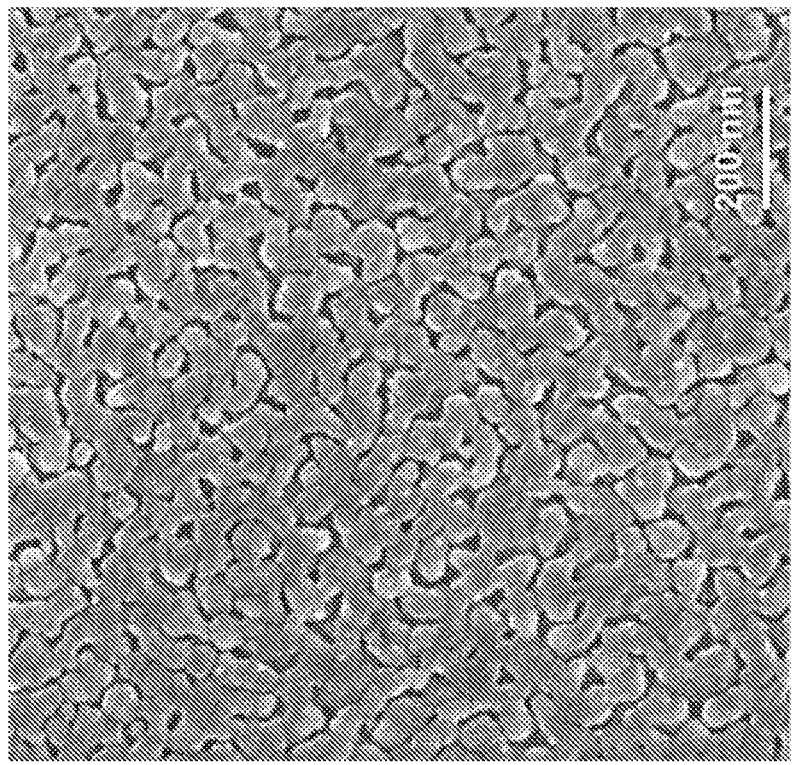
FIG. 3A: Porous NNO/FTO

POROUS PEROVSKITE NICKELATES WITH ENHANCED ELECTROCHROMIC PROPERTIES AND SYSTEMS THEREOF

CROSS-REFERENCE TO RELATED APPLICATIONS

The present patent application is a 35 U.S.C. § 371 Nationalization Application of and claims the priority benefit of the International Patent Application Serial No. PCT/US20/42629 filed Jul. 17, 2020, which is related to and claims the priority benefit of the Provisional Patent Application Ser. No. 62/875,051 filed Jul. 17, 2019, the contents of each of which are hereby incorporated by reference in its entirety into the present disclosure.

STATEMENT REGARDING GOVERNMENT FUNDING

None.

TECHNICAL FIELD

The present disclosure generally relates to electrochromic devices, and in particular, to electrochromic devices with high effective interactive sites with a corresponding electrolyte to effectively increase the diffusion rate of ions in the electrochromic material.

BACKGROUND

This section introduces aspects that may help facilitate a better understanding of the disclosure. Accordingly, these statements are to be read in this light and are not to be understood as admissions about what is or is not prior art.

Electrochromism is a phenomenon wherein an electrochromic oxide material provides a reversible change in optical property when a voltage is applied to the electrochromic oxide material in contact with an electrolyte. The change in optical property may include reflectance and transmittance. Such processes are known and have become ubiquitous in for example electronic rearview mirrors.

In other applications, the electrochromism phenomenon can be used in windows for energy efficiency. In such applications, a small voltage applied to the electrochromic window causes the window to change in transmittance by darkening the window. Alternatively, reversing the voltage polarity causes the windows to increase in transmittance by lightening the windows.

In such applications, in response to a reversed external electrical stimulus, the ideal electrochromic oxide should enable corresponding fast and reversible transmittance change between grey/black and transmissive via reversible redox reactions in contact with electrolyte. The development of highly efficient electrochromic oxide benefits the blooming industry of smart windows which is promising to reduce the energy consumption of vehicles and buildings. However, the optical modulation performance of current candidates still cannot meet the commercial requirement due to their dense structure, low ion diffusion coefficient, and the long diffusion lengths for ion transport.

Therefore, there is an unmet need for a new class of microstructurally engineered porous electrochromic materials with superior opacity change properties under electrical stimuli.

SUMMARY

An electrochromic structure is disclosed. The electrochromic structure includes a first transparent non-conductive (GLASS-I) layer. The structure also includes a first transparent conductor (CONDUCTOR-I) layer coupled to the GLASS-I layer. The electrochromic structure further includes an ion storage layer coupled to the CONDUCTOR-I layer. The electrochromic structure additionally includes an electrolyte layer coupled to the ion storage layer. Furthermore, the electrochromic structure includes an electrochromic layer coupled to the electrolyte layer and a second transparent conductor (CONDUCTOR-II) layer coupled to the electrochromic layer. Additionally, the electrochromic structure includes a second transparent non-conductive (GLASS-II) layer coupled to the CONDUCTOR-II layer. The electrochromic layer of the electrochromic structure includes perovskite nickelates thin films formed on a transparent conductive film substrate and which has crystalline grains of the size of about 5 nm to about 200 nm resulting in intergranular porosity of about 5% to about 25%.

In the above electrochromic structure, the transparent conductive film substrate includes fluoride doped tin oxide (FTO) coated glass.

In the above electrochromic structure, the perovskite nickelates thin films include $NdNiO_3$ (NNO).

In the above electrochromic structure, the structure provides an optical transmittance of between about 20% to about 60%.

In the above electrochromic structure, the structure provides a coloration efficiency (CE) of about 35.1 $m^2$ $C^{-1}$, where CE is defined as a change in optical density ($\Delta OD$) per injected charge density (Q) at 632.8 nm wavelength.

In the above electrochromic structure, the NNO thin films are formed on the transparent conductive film substrate.

A method of making an electrochromic structure is also disclosed. The method includes coupling a first transparent conductor (CONDUCTOR-I) layer to a first transparent non-conductive (GLASS-I) layer. The method also includes coupling an ion storage layer to the CONDUCTOR-I layer. Additionally, the method includes coupling an electrolyte layer to the ion storage layer. Furthermore, the method includes coupling an electrochromic layer to the electrolyte layer. The method also includes coupling a second transparent conductor (CONDUCTOR-II) layer to the electrochromic layer, and coupling a second transparent non-conductive (GLASS-II) layer to the CONDUCTOR-II layer. The electrochromic layer includes perovskite nickelates thin films formed on a transparent conductive film substrate and which has crystalline grains of the size of about 5 nm to about 200 nm and intergranular porosity of about 5% to about 25%.

In the above method, the transparent conductive film substrate includes fluoride doped tin oxide (FTO) coated glass.

In the above method, the perovskite nickelates thin films include $NdNiO_3$ (NNO).

In the above method, the NNO thin films are formed on the transparent conductive film substrate.

In the above method, the NNO thin films are formed on the transparent conductive film substrate by a vacuum evaporation process.

In the above method, the vacuum evaporation process includes magnetron sputtering.

In the above method, the vacuum evaporation process includes chemical vapor deposition.

In the above method, the vacuum evaporation process includes physical vapor deposition.

In the above method, the vacuum evaporation process includes atomic layer deposition.

In the above method, the vacuum evaporation process includes electron beam deposition.

An electrochromic system is also disclosed. The system includes a plurality of electrochromic structures separated from one another by a gap. Each electrochromic structure includes a first transparent non-conductive (GLASS-I) layer. The structure also includes a first transparent conductor (CONDUCTOR-I) layer coupled to the GLASS-I layer. The electrochromic structure further includes an ion storage layer coupled to the CONDUCTOR-I layer. The electrochromic structure additionally includes an electrolyte layer coupled to the ion storage layer. Furthermore, the electrochromic structure includes an electrochromic layer coupled to the electrolyte layer and a second transparent conductor (CONDUCTOR-II) layer coupled to the electrochromic layer. Additionally, the electrochromic structure includes a second transparent non-conductive (GLASS-II) layer coupled to the CONDUCTOR-II layer. The electrochromic layer of the electrochromic structure includes perovskite nickelates thin films formed on a transparent conductive film substrate and which has crystalline grains of the size of about 5 nm to about 200 nm resulting in intergranular porosity of about 5% to about 25%.

In the above electrochromic system, the transparent conductive film substrate includes fluoride doped tin oxide (FTO) coated glass.

In the above electrochromic system, the perovskite nickelates thin films include $NdNiO_3$ (NNO).

In the above electrochromic system, the structure provides an optical transmittance of between about 20% to about 60%.

In the above electrochromic system, the structure provides a coloration efficiency (CE) of about 35.1 $m^2 C^{-1}$, where CE is defined as a change in optical density (AOD) per injected charge density (Q) at 632.8 nm wavelength.

In the above electrochromic system, the NNO thin films are formed on the transparent conductive film substrate.

In the above electrochromic system, the gap includes air.

In the above electrochromic system, the gap includes a resin polymer.

In the above electrochromic system, the gap includes a combination of air and a resin polymer.

BRIEF DESCRIPTION OF DRAWINGS

FIGS. 3A and 3B display top view scanning electron microscopy (SEM) images of porous $NdNiO_3$ (NNO) fluoride doped tin oxide (FTO) (P-NNO) and dense NNO/FTO (D-NNO), respectively.

DETAILED DESCRIPTION

Figure 1:
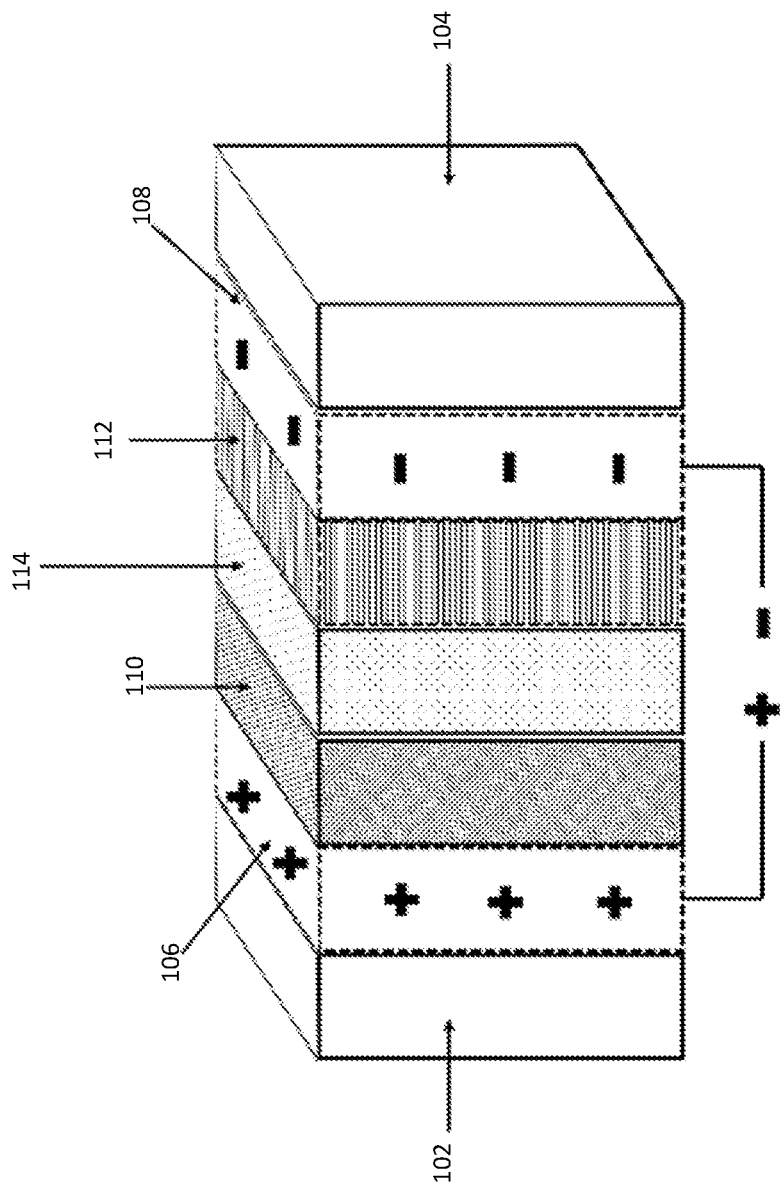
FIG. 1 is a perspective view of a general electrochromic structure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A Novel class of microstructurally engineered porous electrochromic materials with superior opacity change properties under electrical stimuli is described in the present disclosure. To this end, examples of systems are provided where these chromic materials can be incorporated to provide new classes of glass for energy savings in buildings, automobiles, and other applications where tunable optical surfaces can provide advanced opacity changes. To achieve this novel class of electrochromic glass, a nanoporous structure design is provided with more effective interactive sites with the electrolyte to allow reducing the diffusion length of ions within the electrochromic material due to creation of fast transfer channels, high specific surface area. As such, the porosity engineering can effectively improve the switching speed and coloration efficiency of electrochromic oxide materials.

Referring to FIG. 1, a perspective view of a general electrochromic structure 100 is shown. The electrochromic structure 100 typically includes glass layers 102 and 104 as outer peripheral layers. For applications whereby reflection of light is desired, such as rearview mirror applications, one of the outer layers can be a mirror. Between the peripheral glass layers 102 and 104 are conductive layers 106 and 108 coupled to the peripheral glass layers. The conductive layers allow electrical stimulation of the electrochromic structure 100 by coupling to an electrical supply thereby forming a circuit, as shown in FIG. 1. In between the conductive layers 106 and 108 is an ion storage layer 110, an electrolyte layer 114, and an electrochromic layer 112. Charge transport occurs between the conductive layers 106 and 108 and the ion storage layer 110 through and made possible by the electrolyte layer 114. During the charge transport, ions cross the electrochromic layer 112 thereby provide the electrochromic effect of the electrochromic structure 100.

The interface between the electrolyte layer 114 and the electrochromic layer 112 of FIG. 1 is the focus of the present disclosure. In particular, porosity of the electrochromic layer 112 is one of the focus areas of the present disclosure. Specifically, the electrochromic layer 112 includes perovskite nickelates thin films formed on a transparent conductive film substrate and which has crystalline grains of the size of about 5 nm to about 200 nm and intergranular porosity (which represent spacing between crystal grains) of about 5% to about 25%. To demonstrate the improved effect of porosity construction two series of $NdNiO_3$ (NNO) thin films were grown on fluoride doped tin oxide (FTO) coated glass substrates using an exemplary process such as magnetron sputtering technology at room temperature combined with post-annealing in air atmosphere. It should be appreciated, however, that other processes known to a person having ordinary skill in the art are suitable for such deposition, e.g., chemical vapor deposition, solution processing and related film growth techniques, and others. The deposition condition for dense NNO film (D-NNO) is 40/10 sccm $Ar/O_2$ mixture at a low background pressure of 5 mTorr from two metallic Ni (DC, 70 W) and Nd (RF, 170 W) targets. The deposition rate is 140 nm per hour. For comparison, porous NNO (P-NNO) films were also deposited. The deposition condition for porous NNO film (P-NNO) is 40/10 sccm Ar/$O_2$ mixture at a high background pressure of 50 mTorr from one ceramic NdNiO$_3$ target. The power to target is 250 W (RF). The deposition rate is 20 nm per hour. The as-deposited samples were annealed in open air at 500° C. for 24 h in a tube furnace.

Figure 2:
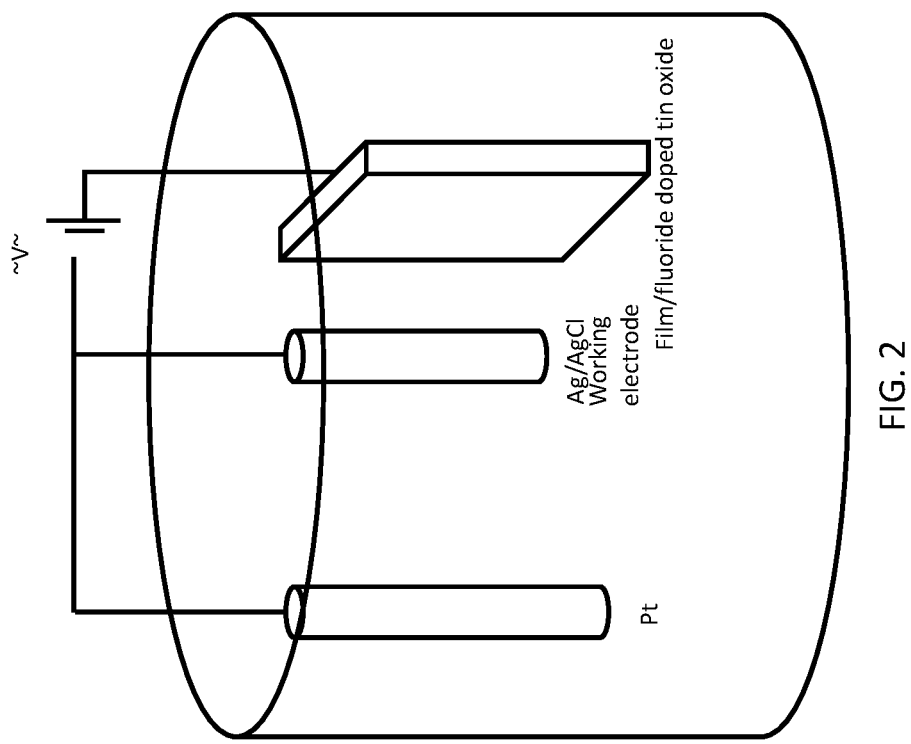
FIG. 2 is a schematic of a test setup for testing the electrochromic structure of the present disclosure.

To measure the electrochromic effect, 0.0005 M (pH=3) sulfuric acid ($H_2SO_4$) aqueous solution was utilized to study the electrochromic properties of NNO in acidic aqueous environment. A three-terminal electrochemical cell was used for measurement (as shown in FIG. 2 which is a schematic of a test setup for testing the electrochromic structure of the present disclosure). A platinum (Pt) wire was bonded on the thin films with silver paste. Silver paste is a type of conducting glue. Thus, Pt wire is used with a silver paste for adhesion. The wire contact of the FTO electrode was covered with inert tape such that the influence of Pt wire can be excluded. The NNO films were then submerged into aqueous solutions and denoted as a working electrode. The counter-electrode was a graphite rod with large surface area. An Ag/AgCl (saturated KCl) was used a reference electrode. During measurement, all three electrodes are submerged into solution. For coloring/bleaching treatment, a static electric potential (vs. Ag/AgCl) was applied to NNO film.

To investigate the effect of growth condition on morphology or porosity of the films, FIGS. 3A and 3B display top view scanning electron microscopy (SEM) images of porous NNO/FTO (P-NNO) and dense NNO/FTO (D-NNO), respectively. It can be observed that P-NNO sample includes nanoparticles with a smaller diameter of 5-200 nm with densely disconnected mesopores. The pore size is around 10-50 nm. In comparison, the D-NNO reveals a dense morphology with the particle size larger than 500 nm with pore size between 50 nm to 200 nm. Referring to FIGS. 3A and 3B, SEM images of Porous NNO/FTO and Dense NNO/FTO are provided, respectively.

Figure 4A:
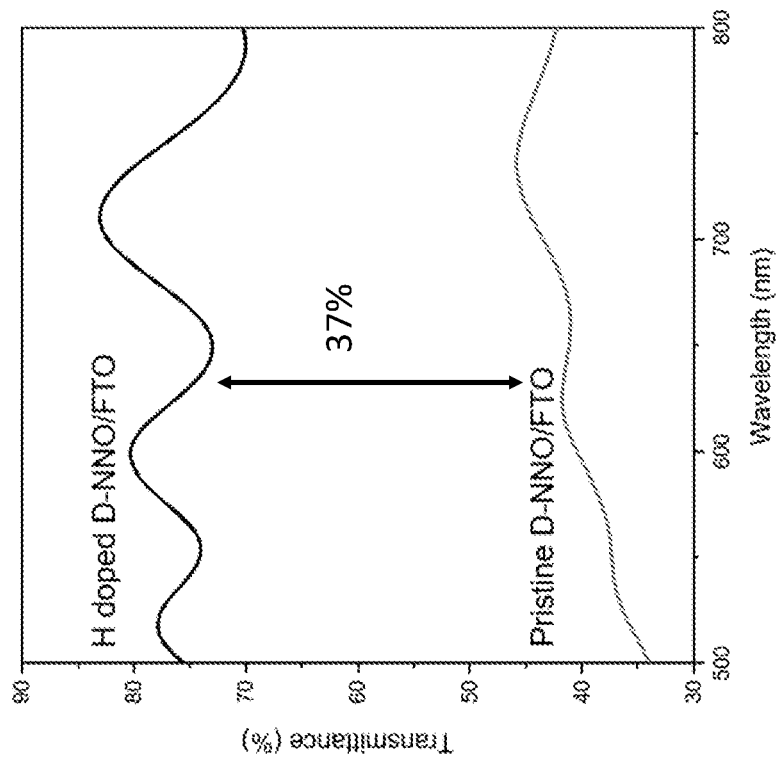
FIGS. 4A and 4B are graphs of transmittance (%) vs. wavelength (nm), optical transmittance spectra of the D-NNO/FTO and P-NNO/FTO in its original and critical bleaching states (−1 V for 5 min) measured in the visible wavelength range of 500-800 nm.
Figure 4B:
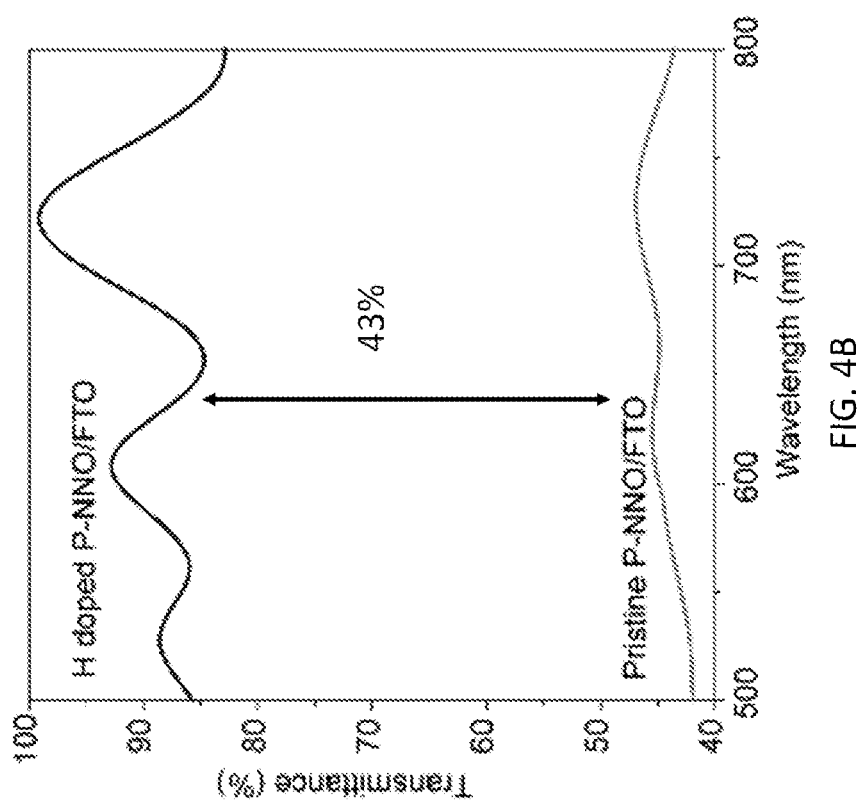

Referring to FIGS. 4A and 4B which are graphs of transmittance (%) vs. wavelength (nm), optical transmittance spectra of the D-NNO/FTO and P-NNO/FTO in its original and critical bleaching states (−1 V for 5 min) measured in the visible wavelength range of 500-800 nm are provided. Optical transmittance spectra of the FTO coated glass and lanthanum aluminate (LaAlO$_3$ or simply LAO) were used as reference used to automatically normalize the data, respectively. Therefore, transmittance was measured by applying a 1 V DC across the NNO layers. Specifically, the pristine D-NNO and P-NNO had an optical transmittance of about 37% and about 43% at the wavelength of 633 nm. Under alternating potentials, the transmittance of them at a wavelength of 632.8 nm could be modulated by about 40% and about 45% (the transmittance difference between pristine and doped states) between the colored and original states.

Figure 4C:
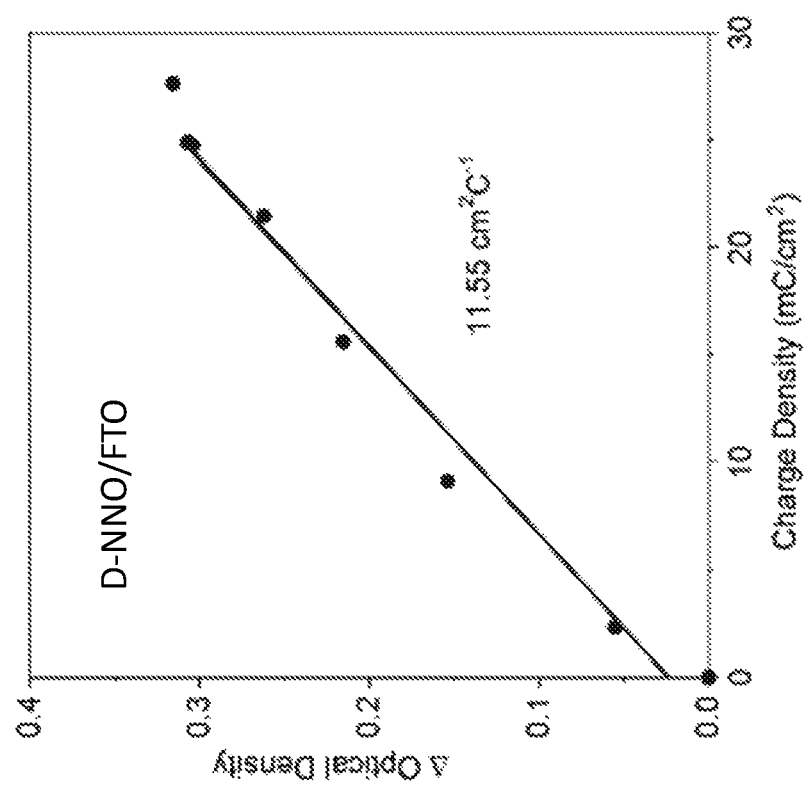
FIGS. 4C and 4D are graphs of A optical density vs. charge density in $mC/cm^2$, and CE can be estimated based on the slope of the quasi-linear curve.
Figure 4D:
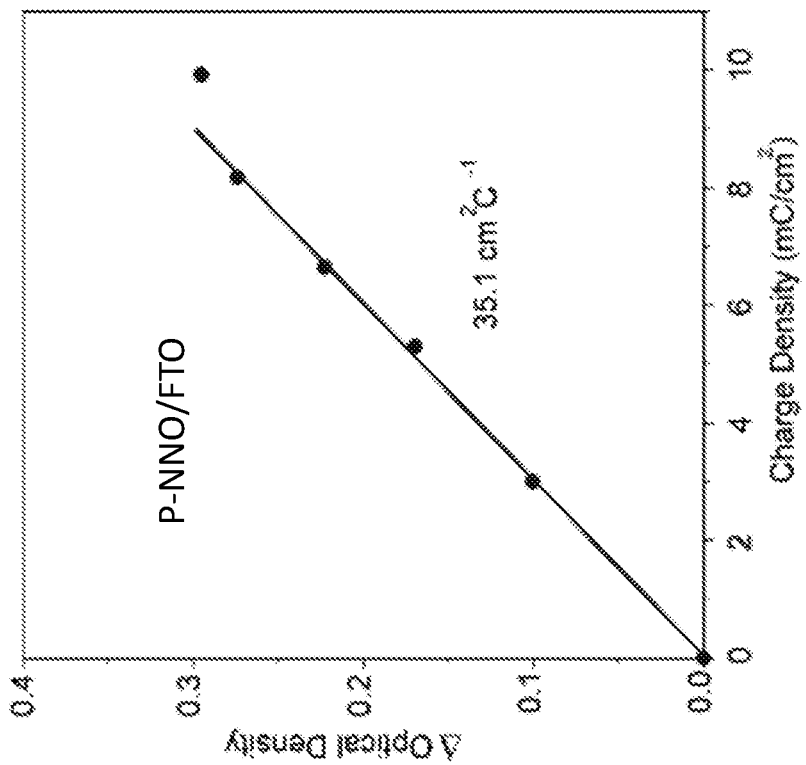

The coloration efficiency (CE) is defined as the change in optical density (AOD) per injected charge density (Q) at a specific wavelength (632.8 nm in the case of the present disclosure). The change in optical density is obtained from equation (1-1 and 1-2)

$$CE = \frac{\Delta OD(\lambda)}{Q} \quad (1)$$

where, $$\Delta OD(\lambda) = \log\left(\frac{T_c}{T_b}\right) \quad (2)$$

where $T_c$ and $T_b$ are the transmittance in the colored and bleached states, respectively. The relationship between AOD and the charge density variation are shown in FIGS. 4C and 4D which are graphs of Δ optical density vs. charge density in mC/cm$^2$, and CE can be estimated based on the slope of the quasi-linear curve. The CE of D-NNO/FTO and P-NNO/FTO could reach 11.55 m$^2$ C$^{-1}$ and 35.1 m$^2$ C$^{-1}$, for D-NNO/FTO and P-NNO/FTO, respectively. From the aforementioned figures, it can be seen that the efficiency of P-NNO is more than 3× higher than the D-NNO.

The design of typical smart windows based on porous NNO electrochromic film was shown in FIG. 1. The smart windows device with the electrochromic structure 100 may include a few ultra-thin layers: the electrolyte layer 114 in the middle of the structure 100 (potential candidate could be solid (LiF), ion liquid (LiClO4) and polymer (ethylene oxide), thickness ranging from 10 μm to 500 μm). An ion storage layer or electrochromic film 110 (potential candidate could be metal oxides, metal-ligand complexes, nanocrystals, small organic molecules and polymer, thickness ranging from 10 nm to 500 nm), and the porous NNO layer 112 (thickness ranging from 10 nm to 500 nm), according to the present disclosure, on each side of the electrolyte layer 114, and two transparent conductor layers 106 and 108 (potential candidates could include radical polymer, minimally color changing metal oxide, and complementarily coloring polymers, thickness ranging from 1 nm to about 200 nm) coated glass layers 102 and 104 (thickness ranging from 0.1 mm to approximately 10 mm) sandwiching as-mentioned three layers on both ends of the electrochromic structure 100. The external bias could be applied between the two transparent conductors layers 106 and 108 to switch the transmittance of the entire electrochromic structure 100.

When making this design into a scalable device, current crowding effect must be taken into consideration. This phenomenon may cause two significant failures, one is incompleteness in color change and another is risk of a thermal event caused by rapid concentration of current, Joule energy.

In order to reduce the potential of these problems, dividing the electrochromic structure 100 into small pieces is effective because even if there is a current crowding area such as a pinhole-like situation with the area which has less resistivity than others, only a piece of electrochromic structure 100 including the area will take more time to complete color change in entire area of the piece, and thus other pieces can work properly. Moreover, creating parallel circuit reduces a potential for firing because each area requires only 1.5 V/cm$^2$. For instance, if 100 cm$^2$ device with one current crowding point is created as a single device, it should be suffering from 150 V while the case of dividing it into 100×1 cm$^2$ pieces allow 1.5 V to operate each pieces and the point should be only damaged by 1.5 V.

Divided devices are fabricated by cutting transparent conductors, ion-storage (or electrochromic film), electrolyte and P-NNO film. A mechanical method such as blading or sandblast, or optical method such as laser ablation is appropriately used.

Figure 5:
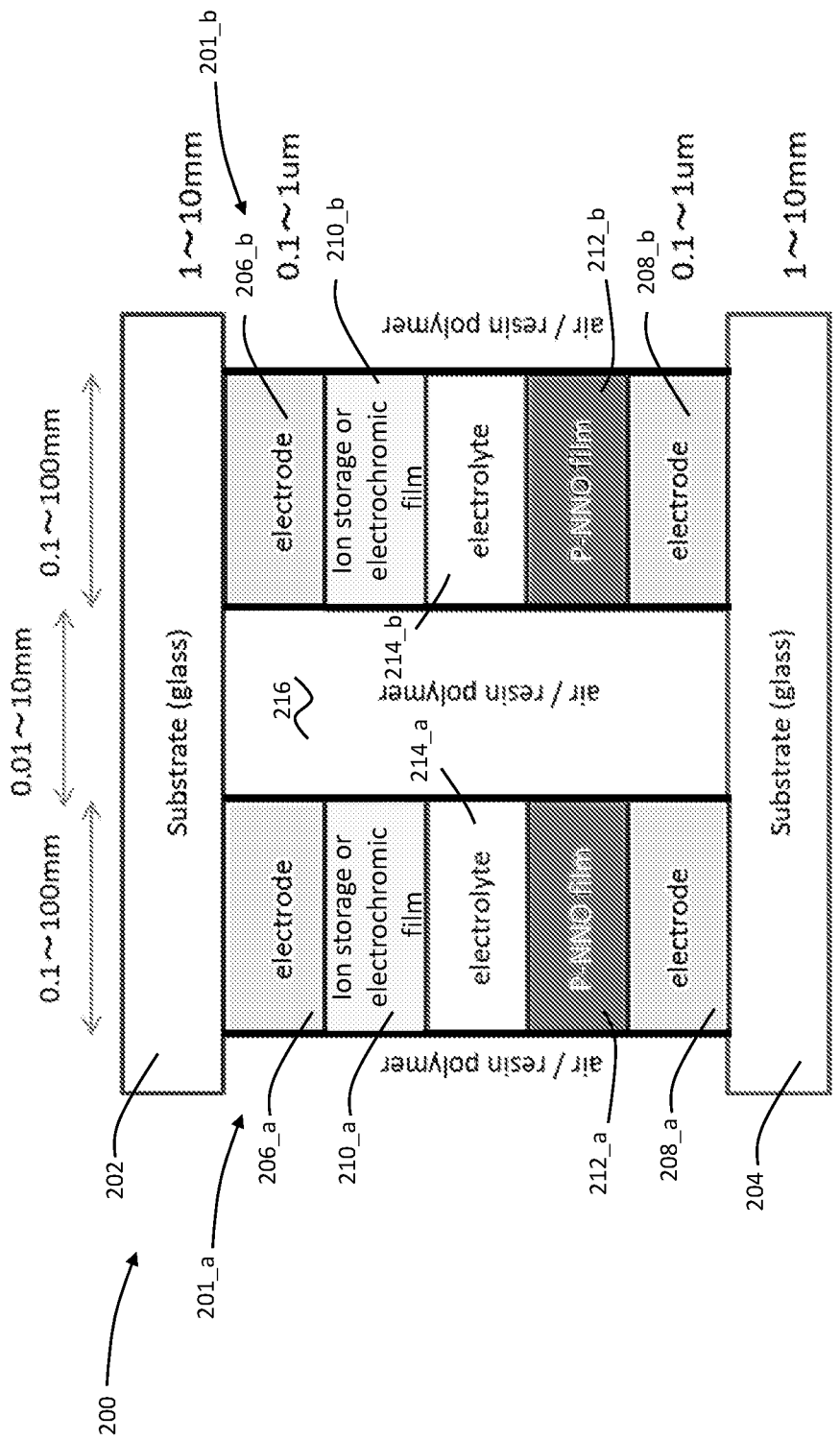
FIG. 5 is a front view an embodiment of an electrochromic structure, according to the present disclosure.

Referring to FIG. 5, a front view an embodiment of an electrochromic structure 200 according to the present disclosure is provided. As in reference to FIG. 1, the electrochromic structure 200 typically includes glass layers 202 and 204 as outer peripheral layers. For applications whereby reflection of light is desired, such as rearview mirror applications, one of the outer layers can be a mirror. Between the peripheral glass layers 202 and 204 are conductive layers 206_a, 206_b and 208_a, 208_b coupled to the peripheral glass layers 202 and 204. The conductive layers 206_a, 206_b and 208_a, 208_b are shown in FIG. 5 as electrodes and allow electrical stimulation of the electrochromic structure 200 by coupling to an electrical supply thereby forming a circuit (not shown, but reference is made to FIG. 1). In between the conductive layers 206_a, 206_b and 208_a, 208_b are ion storage layers (or electrochromic layers) 210_a and 210_b, electrochromic layers 212_a and 212_b, and electrolyte layers 214_a and 214_b. Charge transport occurs between the conductive layers 206_a, 206_b and 208_a, 208_b and the ion storage layers 210_a and 210_b through and made possible by the electrolyte layers 214_a and 214_b. During the charge transport, ions cross the electrochromic layers 212_a and 212_b thereby provide the electrochromic effect of the electrochromic structure 200. The divided electrochromic structure 200 shown in FIG. 5 includes two columns 201_a and 201_b. The space between the columns 201_a and 201_b is filled with air or a resin material (e.g., perfluorosulphonate ionomer NAFION).

As discussed with reference to FIG. 1, the interface between the electrolyte layers 214_a and 214_b and the electrochromic layers 212_a and 212_b is the focus of the present disclosure. In particular, porosity of the electrochromic layers 212_a and 212_b is one of the focus areas of the present disclosure. Specifically, the electrochromic layers 212_a and 212_b includes perovskite nickelates thin films formed on a transparent conductive film substrate and which has crystalline grains of the size of between about 5 nm to about 200 nm and intergranular porosity of about 5% to about 25%. Porous NNO (P-NNO) films are used as the electrochromic layers 212_a and 212_b, as discussed with reference to FIG. 1

Each column 201_a and 201_b is between about 0.1 mm to about 100 mm. These columns are separate by between about 0.01 mm to about 10 mm. The glass layers 202 and 204 are appropriately sized to the correct application. For example, the glass layers 202 and 204 can be between about 1 mm to about 10 mm thick depending on their application, with smart window applications more in the 10 mm range. Similarly, the conductive layers 206_a, 206_b and 208_a, 208_b can be designed as appropriate for the application to be sized between about 0.1 µm to about 1 µm.

In addition to performance improvement in transmissibility, the porous NNO structure disclosed herein also improves ion trapping effect (lowers) as the exposed surfaces allow improved reversibility of transmittance.

Those having ordinary skill in the art will recognize that numerous modifications can be made to the specific implementations described above. The implementations should not be limited to the particular limitations described. Other implementations may be possible.

The invention claimed is:

1. An electrochromic structure, comprising:
a first transparent non-conductive (GLASS-I) layer;
a first transparent conductor (CONDUCTOR-I) layer coupled to the GLASS-I layer;
an ion storage layer coupled to the CONDUCTOR-I layer;
an electrolyte layer coupled to the ion storage layer;
an electrochromic layer coupled to the electrolyte layer;
a second transparent conductor (CONDUCTOR-II) layer coupled to the electrochromic layer; and
a second transparent non-conductive (GLASS-II) layer coupled to the CONDUCTOR-II layer,
wherein the electrochromic layer includes perovskite nickelates thin films formed on the CONDUCTOR-II layer and which has crystalline grains of the size of about 5 nm to about 200 nm resulting in intergranular porosity of about 5% to about 25%.

2. The electrochromic structure of claim 1, wherein the CONDUCTOR-II layer includes fluoride doped tin oxide (FTO) coated glass.

3. The electrochromic structure of claim 1, wherein the perovskite nickelates thin films include NdNiO3 (NNO).

4. The electrochromic structure of claim 1, wherein the structure provides an optical transmittance of between about 20% to about 60%.

5. The electrochromic structure of claim 1, wherein the structure provides a coloration efficiency (CE) of about 35.1 $m^2\ C^{-1}$, where CE is defined as a change in optical density ($\Delta OD$) per injected charge density (Q) at 632.8 nm wavelength.

6. The electrochromic structure of claim 3, wherein the NNO thin films are formed on the CONDUCTOR-II layer.

7. A method of making an electrochromic structure, comprising:
coupling a first transparent conductor (CONDUCTOR-I) layer to a first transparent non-conductive (GLASS-I) layer;
coupling an ion storage layer to the CONDUCTOR-I layer;
coupling an electrolyte layer to the ion storage layer;
coupling an electrochromic layer to the electrolyte layer;
coupling a second transparent conductor (CONDUCTOR-II) layer to the electrochromic layer; and
coupling a second transparent non-conductive (GLASS-II) layer to the CONDUCTOR-II layer,
wherein the electrochromic layer includes perovskite nickelates thin films formed on the CONDUCTOR-II layer and which has crystalline grains of the size of about 5 nm to about 200 nm and intergranular porosity of about 5% to about 25%.

8. The method of claim 7, wherein the CONDUCTOR-II layer includes fluoride doped tin oxide (FTO) coated glass.

9. The method of claim 7, wherein the perovskite nickelates thin films include NdNiO3 (NNO).

10. The method of claim 9, wherein the NNO thin films are formed on the CONDUCTOR-II layer.

11. The method of claim 10, wherein the NNO thin films are formed on the CONDUCTOR-II layer by a vacuum evaporation process.

12. The method of claim 11, wherein the vacuum evaporation process includes magnetron sputtering.

13. The method of claim 11, wherein the vacuum evaporation process includes chemical vapor deposition.

14. The method of claim 11, wherein the vacuum evaporation process includes physical vapor deposition.

15. The method of claim 11, wherein the vacuum evaporation process includes atomic layer deposition.

16. The method of claim 11, wherein the vacuum evaporation process includes electron beam deposition.

17. An electrochromic system, comprising:
a plurality of electrochromic structures separated from one another by a gap, each electrochromic structure comprising:
a first transparent non-conductive (GLASS-I) layer;
a first transparent conductor (CONDUCTOR-I) layer coupled to the GLASS-I layer;

an ion storage layer coupled to the CONDUCTOR-I layer;

an electrolyte layer coupled to the ion storage layer;

an electrochromic layer coupled to the electrolyte layer;

a second transparent conductor (CONDUCTOR-II) layer coupled to the electrochromic layer; and a second transparent non-conductive (GLASS-II) layer coupled to the CONDUCTOR-II layer, wherein the electrochromic layer includes perovskite nickelates thin films formed on the CONDUCTOR-II layer and which has crystalline grains of the size of about 5 nm to about 200 nm resulting in intergranular porosity of about 5% to about 25%.

18. The electrochromic system of claim 17, wherein the CONDUCTOR-II layer includes fluoride doped tin oxide (FTO) coated glass.

19. The electrochromic system of claim 17, wherein the perovskite nickelates thin films include NdNiO3 (NNO).

20. The electrochromic system of claim 17, wherein the structure provides an optical transmittance of between about 20% to about 60%.

21. The electrochromic system of claim 17, wherein the structure provides a coloration efficiency (CE) of about 35.1 $m^2 C^{-1}$, where CE is defined as a change in optical density ($\Delta$OD) per injected charge density (Q) at 632.8 nm wavelength.

22. The electrochromic system of claim 19, wherein the NNO thin films are formed on the CONDUCTOR-II layer.

23. The electrochromic system of claim 17, the gap includes air.

24. The electrochromic system of claim 17, the gap includes a resin polymer.

25. The electrochromic system of claim 17, the gap includes a combination of air and a resin polymer.

* * * * *